United States Patent
Sifri et al.

[15] 3,654,834
[45] Apr. 11, 1972

[54] FLUID BYPASS VALVE

[72] Inventors: Elie C. Sifri; Matthew Shibahara, both of Portland, Oreg.

[73] Assignee: Cascade Corporation, Portland, Oreg.

[22] Filed: May 27, 1970

[21] Appl. No.: 41,012

[52] U.S. Cl.....................................91/399, 91/401, 91/422
[51] Int. Cl.............................................................F15b 15/22
[58] Field of Search..................91/399, 23, 401, 406, 392, 91/400, 404, 405, 422; 137/516.25, 513, 512.4, 512.15, 528

[56] References Cited

UNITED STATES PATENTS

| | | | |
|---|---|---|---|
| 56,898 | 8/1866 | Cabell | 91/401 X |
| 2,878,836 | 3/1959 | Binks | 137/512.15 X |
| 3,023,740 | 3/1962 | Samuel, Jr. et al | 91/401 X |
| 3,038,487 | 6/1962 | Gardner | 251/368 X |
| 3,244,193 | 4/1966 | Loveless | 137/625.27 X |
| 3,253,515 | 5/1966 | Wilkinson | 91/401 |
| 3,289,549 | 12/1966 | Purcell | 91/422 X |

FOREIGN PATENTS OR APPLICATIONS

| | | | |
|---|---|---|---|
| 546,378 | 8/1922 | France | 91/401 |

*Primary Examiner*—Edgar W. Geoghegan
*Assistant Examiner*—Irwin C. Cohen
*Attorney*—Kolisch & Hartwell

[57] ABSTRACT

A fluid bypass valve for a hydraulic ram. A fluid bypass channel is provided through the piston of a ram, that includes enlarged recessed portions opening on either side of the piston. A pair of elastomeric seals are reciprocally mounted in the recesses, secured to a pin that is slidable within the channel. Fluid pressure on either side of the piston acts upon the seal on that side of the piston forcing it into the recess to seal the bypass channel, with the seal at the other end of the pin extending beyond the surface of the piston. When used to reduce shock at the end of a piston stroke the seals move to open up the bypass channel.

4 Claims, 4 Drawing Figures

PATENTED APR 11 1972  3,654,834
FIG. 1
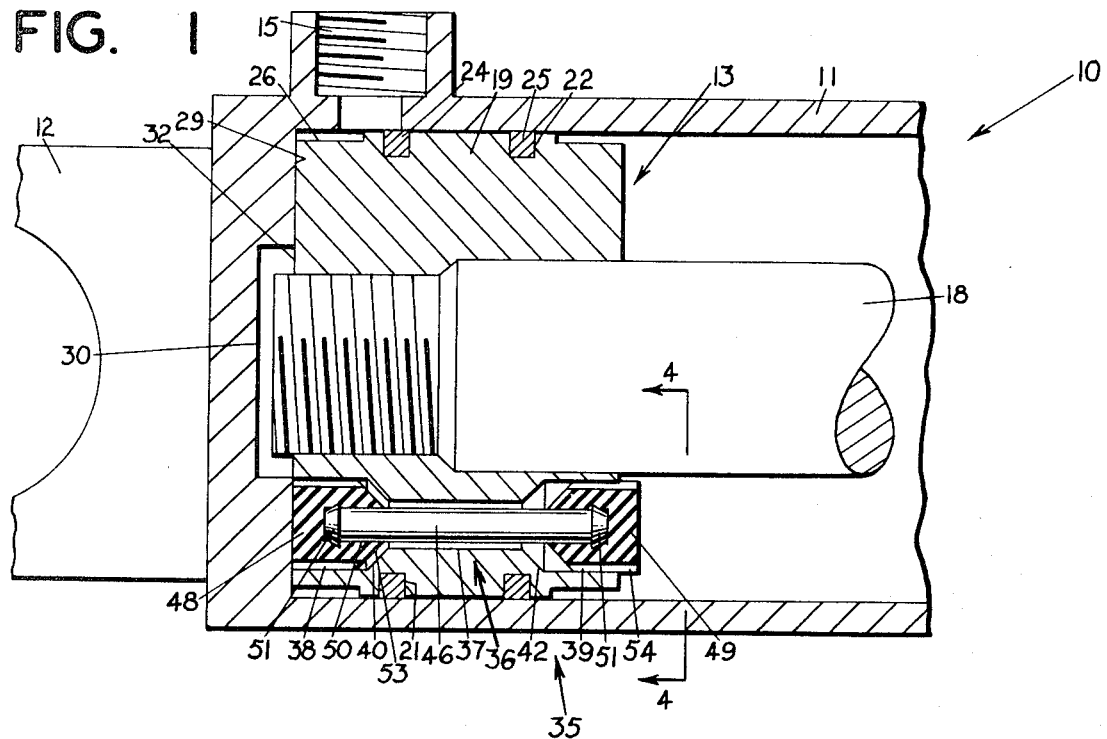
FIG. 2
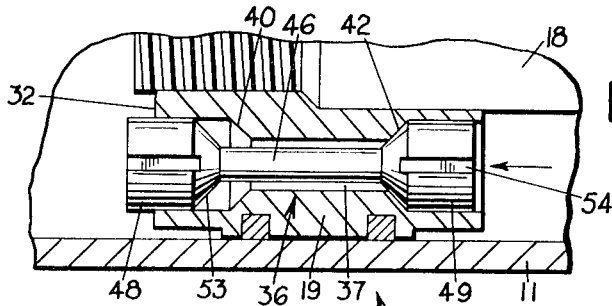
FIG. 3
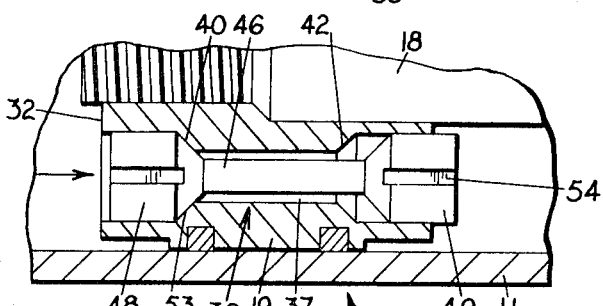
FIG. 4
ELIE C. SIFRI
MATTHEW SHIBAHARA
INVENTOR.
BY Kolisch & Hartwell
ATTY.

FLUID BYPASS VALVE

BACKGROUND OF THE INVENTION

The present invention concerns an improved fluid bypass valve. More particularly, the invention relates to a fluid bypass valve especially adapted for use in a hydraulic ram.

In the manufacture and use of hydraulic apparatus it has been found that the shocks that occur during operation between relatively movable fluid-operated members can cause significant damage. In particular, shocks that occur in a hydraulic ram as the piston reaches the end of its stroke are objectionable. Such shocks can occur in any extensible ram when a piston bottoms or reaches the outer limit of its stroke, and can occur in a multiple extensible ram when the first extensible member reaches the end of its stroke and fluid pressure is transferred to the second extensible member. Aside from the damage caused by such shocks, they are objectionable in that they interrupt smooth operation of the ram.

Accordingly, fluid bypass valves have been utilized in hydraulic rams to reduce impact shocks. In addition, bypass valves have been used for producing sequential operation of fluid motors, where the fluid operating the second motor is channeled through the first motor.

One bypass valve known in the prior art includes a resilient sealing member supported within an internal chamber in the piston head upon a slidable pin, adapted to extend on either side of the piston head through fluid bypass channels that communicate with the internal chamber. Fluid pressure exerted from one side of the piston stroke, acts to force the sealing member into sealing contact with the end of the internal chamber for closing the bypass channel. However, just prior to the bottoming of the piston, the end of the pin on the other side of the piston contacts the end wall of the cylinder. This contact forces the pin back and moves the sealing member away from the end of the internal chamber whereby the bypass channel is opened. Consequently, fluid pressure behind the piston is relieved through the bypass channel and the piston impact against the end of the cylinder is reduced.

Although this type of bypass valve gives satisfactory performance over short periods of usage, there are certain inherent disadvantages in the valve design. For example, the ends of the slidable pin tend to deform excessively upon repeated contact with the end wall of the cylinder. Furthermore, the force exerted upon the pin when it strikes the end of the cylinder causes the pin to slide or work its way out of the sealing member. In addition, since the sealing member is confined within an internal chamber in the piston head, the bypass valve is expensive to fabricate and is difficult to install and service.

SUMMARY OF THE INVENTION

Accordingly, it is an object of the invention to provide an improved fluid bypass valve that overcomes the disadvantages of conventional valves.

It is another object of the invention to provide an improved fluid bypass valve for reducing shocks that occur between relatively movable fluid-operated members.

It is a further object of the invention to provide an improved fluid bypass valve that is especially adapted for use with a hydraulic ram for reducing shocks that occur upon bottoming of the piston of the ram.

It is yet another object of the invention to provide an improved fluid bypass valve especially adapted for use with double-acting and multiple extensible hydraulic rams for reducing shocks therein.

These and other objects of the invention are attained by a valve design which includes a fluid bypass channel formed through one of the relatively movable members of the apparatus. The bypass channel includes a cylindrical central portion and enlarged end portions, with a pair of valve seats being formed around the periphery of the channel at the junctions of the end portions with the central portion. An elongate pin extends through the bypass channel, being slidable therein. On each end of the pin a resilient member is secured, adapted to slidably fit within a corresponding enlarged portion of the bypass channel and to sealingly engage, when under positive fluid pressure, the corresponding valve seat associated therewith. The resilient members are provided with fluted side surfaces to permit adequate fluid flow through the valve when the bypass channel is open.

BRIEF DESCRIPTION OF THE DRAWINGS

These and other objects of the invention will become more apparent from the following detailed description of the invention taken in conjunction with the accompanying drawings, wherein:

FIG. 1 is a partial side elevation view in section of a single extensible hydraulic ram including a fluid bypass valve designed in accordance with the invention;

FIG. 2 is an enlarged fragmentary side view, in section, of the hydraulic ram with the bypass valve in another position;

FIG. 3 is another enlarged fragmentary side view, in section, of the hydraulic ram with the bypass valve in yet another position; and FIG. 4 is an enlarged end view of the valve taken along lines 4—4 in FIG. 1.

DETAILED DESCRIPTION OF THE INVENTION

Referring now to the drawings, the invention is illustrated and described in conjunction with a double-acting single extensible hydraulic ram. It should be realized, however, that the fluid bypass valve described herein has utility in conjunction with single-acting rams and with double extensible rams, as well as with other hydraulic equipment requiring bypass valve means.

In FIG. 1, a portion of a hydraulic ram is generally indicated at 10 including a cylinder 11 having an end wall 12 and a piston 13 reciprocal in the cylinder in response to fluid pressure exerted in either of two directions. To power the piston on a forward stroke, fluid pressure is applied to the back of the piston head through an inlet vent, not shown, and fluid is freely exhausted from the forward side of the piston head through an exhaust vent 15 formed in the cylinder wall. In conventional fashion, the movement of the piston is reversed by applying positive fluid pressure through duct 15 and exhausting fluid from the back side of the piston through the vent, not shown.

The piston includes a shaft 18 and a head 19 reciprocal within cylinder 11. The piston head 19 includes grooves 21, 22 formed about the periphery thereof, having conventional sealing rings 24, 25 inserted therein to form a moving pressure seal between the piston head and cylinder. As shown, the piston head also includes a recessed portion 26 formed about the periphery thereof to permit fluid pressure admitted through duct 15 to operate the piston from an extreme position with the piston head in contact with end wall 12 of the cylinder. The end wall of the cylinder includes a planar outer portion 29 and a recessed portion 30 formed in the center of the end wall to provide clearance for the end of shaft 18 extending through piston head 19. The front face 32 of the piston head is adapted to fit closely against portion 29 of the cylinder end wall when the piston is fully extended at the end of its stroke. Accordingly, the piston head can impact against the end wall of the cylinder with considerable force.

To prevent such impact, fluid bypass means generally indicated at 35 are provided. The fluid bypass means include a fluid bypass channel or passage 36 formed through piston head 19. The bypass channel comprises an inner constricted portion 37 of generally cylindrical form and enlarged end portions 38, 39 also of generally cylindrical configuration. A valve seat 40 is formed about the inner periphery of enlarged portion 38 at its juncture with inner portion 37 and a similar valve seat 42 is formed about the inner periphery of portion 39 at its juncture with portion 37 of the channel.

A pin 46 is provided within the fluid channel, adapted to be slidable therein. Sufficient clearance is provided between the pin and the wall of the inner portion of the fluid channel to permit substantial fluid flow therebetween.

Elastomeric sealing members 48, 49, respectively, are secured at the ends of pin 46, as shown. Sealing member 48 is of generally cylindrical configuration having a bore 50 formed at the inner end thereof adapted to fit over pin 46. Due to the resilient nature of member 48, the sides of bore 50 can be extruded sufficiently to slide over an enlarged head portion 51 of the end of the pin. Thereafter, the shoulders of head portion 51 of the pin engage the inner surface of bore 50 and retain member 48 in firm engagement with the pin. The inner end of member 48 has an inclined shoulder 53 formed about the periphery thereof, adapted to sealingly engage valve seat 40 when member 48 is moved to a position at the bottom of the recess. The outer end of member 48 is of planar configuration and the side walls of member 48 have elongate recesses 54 formed therein as best illustrated in FIG. 4. The elongate recesses provide fluid channels along the side walls of member 48 to permit adequate fluid flow therethrough when the bypass channel is otherwise open. The length of sealing member 48 is somewhat less than the length of the corresponding recess formed in the piston head. This enables the sealing member to rest entirely within the recess without shoulder 53 being in sealing engagement with valve seat 40.

Sealing member 49 is of identical configuration to member 48 and is secured in opposed, symmetrical relationship at the other end of pin 46, adapted to sealingly engage valve seat 42 when positive pressure is applied to the outer end of member 49.

In the position shown in FIG. 1, the valve is in an intermediate, or open, position wherein the sealing surface of member 48 is not in engagement with valve seat 40 and the sealing surface of member 49 is not in sealing engagement with valve seat 42. Referring now to FIG. 2, the valve is shown in a closed position with positive fluid pressure exerted from the right tending to retain member 49 in sealing engagement with valve seat 42. In FIG. 3, the valve is shown in another closed position with positive fluid pressure exerted from the left tending to hold member 48 in sealing engagement with valve seat 40.

In a usual sequence of operation, with the piston moving from right to left under positive fluid pressure, the bypass valve is closed with sealing member 49 in engagement with valve seat 42. In that position, the end of member 48 which is now functioning as a resilient stop member, extends beyond end surface 32 of the piston head whereby it will contact the end of the cylinder wall before the piston head. Upon initial contact between member 48 and end wall 29 of the cylinder, pin 46 is forced to the right as viewed in FIG. 2 and member 49 is forced away from valve seat 42. Since member 48 is sufficiently short that it will fit completely within recess 38, with its outer side flush with the side of the piston, without forming a seal at that end of the valve, the bypass channel is opened and fluid from behind the piston can escape through the bypass channel and out through exhaust vent 15. This serves to reduce the fluid pressure behind the piston and lessen the impact between the piston head and the end wall of the cylinder.

Upon movement of the piston in the other direction, as would occur when positive fluid pressure is exerted through duct 15, the fluid acts upon the outer end of member 48. Such pressure tends to move member 48 to the inner portion of recess 38 and into sealing engagement with valve seat 40. This contact serves to close the valve. With the valve closed, member 49 extends beyond the back surface of the piston head to make the initial contact with the other end wall of the cylinder and again open the bypass valve and reduce impact between the piston head and the other end of the cylinder.

Although a fluid bypass valve having symmetrical elements has been illustrated and described hereinbefore, it should be realized that the invention is not limited to such a design. Thus, for a single-acting hydraulic ram the bypass valve need not include valve seats at either end of the bypass channel. Furthermore, for a single-acting ram only one end of the pin need extend beyond the piston head.

It should also be apparent that the bypass valve described could be installed with equal utility to provide a bypass channel between other relatively movable fluid-operated members. In particular, the valve could be installed in a double-extensible ram to control the transfer of fluid pressure from within the first extensible member to the second extensible member when the first member reaches the end of the stroke.

It is claimed and desired to secure by letters patent:

1. In a fluid-operated ram including a cylinder, an end wall at one end of the cylinder, and a piston movable in a stroke towards said end wall one side of the piston facing said end wall during said stroke, bypass valve means for said piston comprising, a passage extending through the piston connecting with said one side of the piston and the side of the piston opposite said one side, said passage including a constricted portion intermediate opposite sides of the piston and an enlarged portion where the passage connects with said opposite side of the piston, said enlarged portion having an inner end inwardly on the piston from said opposite side defined by a valve seat, an elongate pin extending through such passage slidably and loosely received within said constricted portion with sufficient clearance about the pin to accommodate fluid flow past the pin, a valve member secured on the end of the pin proximate said opposite side of the piston, said valve member having a length less than the length of the enlarged portion of said passage and being slidably engaged with said enlarged portion and movable into sealing engagement with said valve seat when fluid pressure is exerted on the valve member from said opposite side of the piston, means for permitting fluid flow past said valve member and into said constricted portion with the valve member displaced from said valve seat, and a stop member secured on the other end of said piston, the valve member, pin and stop member having a combined length such that the stop member extends beyond said one side of said piston with said valve member in sealing engagement with said valve seat, said stop member moving into engagement with said end wall with the piston moved toward the end of its said stroke, said stop member having a configuration whereby fluid flow is accommodated past the stop member and into said constricted portion of said passage with the stop member positioned with its outer side flush with said one side of the piston.

2. In a fluid-operated ram including a cylinder, end walls at opposite ends of said cylinder, and a piston movable in strokes between said end walls, bypass valve means for said piston comprising, a passage extending through the piston connecting with opposite sides of the piston, said passage including a constricted portion intermediate opposite sides of the piston and enlarged outer portions disposed at opposite ends of the constricted portion opening to opposite sides of the piston, each enlarged portion having an inner end inwardly on the piston defined by a valve seat, an elongate pin extending through said passage slidably and loosely received within said constricted portion with sufficient clearance about the pin to accommodate fluid flow therepast through said constricted portion, a pair of resilient valve members secured, one to each end of said pin, each valve member being slidably engaged with an enlarged portion of said passage, each valve member having a sealing shoulder formed on an inner end thereof for engagement with a valve seat which forms the end of the enlarged portion receiving the valve member, the length of each valve member being less than the length of the enlarged portion receiving the valve member, each valve member having a construction whereby with its sealing shoulder displaced from its valve seat associated therewith fluid flow is accommodated past the valve member, the combined length of the valve members and pin being such that with the sealing shoulder of one of said valve members in sealing engagement with its associated valve seat the other of the valve members extends beyond the adjacent side of said piston in position to engage an end wall of the ram upon said piston nearing the end of a stroke.

3. The bypass valve means claimed in claim 2, wherein each valve member has at least one groove formed along the side thereof accommodating fluid flow past the valve member when the sealing shoulder of the valve member is displaced from its associated valve seat.

4. The valve means claimed in claim 2, wherein each valve member includes a bore formed in the inner end thereof which fits over an end of said pin, and said pin includes enlarged portions at the ends thereof, each enlarged portion engaging the sides of a bore in a valve member to retain the valve member on said pin.

* * * * *